United States Patent Office 3,660,536
Patented May 2, 1972

3,660,536
PROCESS FOR MANUFACTURE OF POLYMERS OF CONJUGATED DIENES
Satoshi Ayano, Naka-gun, Kanagawa-ken, and Seizo Yabe, Yokohama-shi, Japan, assignors to Japan Gas-Chemical Company, Inc., Tokyo, Japan
No Drawing. Filed Dec. 27, 1968, Ser. No. 787,618
Claims priority, application Japan, Dec. 29, 1967, 43/84,844
Int. Cl. C08d *1/32;* C08f *15/04*
U.S. Cl. 260—880 R
6 Claims

ABSTRACT OF THE DISCLOSURE

A process for the manufacture of polymers of conjugated dienes which comprises polymerizing anion-polymerisable hydrocarbons of the conjugated diene series in a non-polar solvent in the presence of a catalytic amount of an adduct of lithium and hydrocarbon, said adduct being prepared by reacting metallic lithium with a polycyclic aromatic hydrocarbon having 10–30 carbon atoms in an aliphatic ether, removing from the reaction product insoluble matter, adding to the obtained solution 1–10 moles, per mole of the lithium in the solution, of an ethylenically unsaturated hydrocarbon selected from the group consisting of conjugated diene hydrocarbons, vinyl-substituted aromatic hydrocarbons and vinylidene-substituted aromatic hydrocarbons, and thereafter substantially removing the aliphatic ether from the resulting solution.

---

This invention relates to a process for the manufacture of polymers of conjugated dienes by polymerising conjugated dienes in the presence of a catalytic amount of an adduct of lithium and hydrocarbon, and particularly to a process for the manufacture of polymers of conjugated dienes which are rich in cis-1,4 structural unit content and have excellent mechanical properties by using as initiator an oligomeric dilithium adduct, i.e., oligomer dilithium, having a uniform molecular weight.

It is known that a complex formed between a polycyclic aromatic hydrocarbon and an alkali metal is capable of initiating the polymerisation of various anionic monomers. For instance, U.S. Pat. 3,170,903 discloses a process for polymerising isoprene or butadiene by using a complex of lithium and polycyclic aromatic hydrocarbon such as naphthalene. Such complex is not sufficiently soluble in a non-polar solvent, and therefore it is difficult to control the molecular weight of the resulting polymer. Consequently, the molecular weight distribution of the resulting polymer tends to be broadened. This method has a further disadvantage that the cis-1,4 structural unit content of the obtained conjugated diene polymer is not sufficiently high, with the result that such conjugated diene polymer, when made into the final vulcanized rubber products, has inferior mechanical properties such as modulus, elongation and tensile strength.

U.S. Pats. 3,157,604 and 3,287,333 disclose that a polymerisation initiator is prepared by reacting lithium with isoprene, butadiene or styrene in the presence of a polycyclic aromatic compound and that a conjugated diene alone or a conjugated diene and a vinyl-substituted aromatic hydrocarbon are polymerised with the use of this polymerisation initiator to form a homopolymer or a block copolymer. According to this method of producing a polymerisation initiator, however, the molecular weight distribution of the obtained adduct of an oligomer and lithium is very broad, giving a product of 1,2- or 3,4-structural unit having a low degree of polymerisation and simultaneously a product of 1,2- or 3,4-structural unit having a high degree of polymerisation as by-products. The reaction product, therefore, becomes very viscous, and it is difficult to remove therefrom a polar solvent, such as ethers, which adversely affects the 1,4-polymerisation of conjugated dienes. A small amount of complex of lithium and polycylic aromatic hydrocarbon or metal lithium still remains in the reaction product, and it becomes difficult to obtain a homogeneous solution of the initiator. This in turn makes it difficult to control the molecular weight of the intended polymers of conjugated dienes. Thus, employing this method, it is difficult to obtain polymers of conjugated dienes which contain more than 90% cis-1,4 structural units and those wherein the molecular weight distribution is controlled within a narrow range. Furthermore, when made into final rubber products by compounding and vulcanizing, these polymers have only low mechanical properties.

We have reacted metallic lithium with polycyclic aromatic hydrocarbons in aliphatic ethers, removed insoluble residues from the reaction products, and added conjugated diene hydrocarbons, vinyl-substituted aromatic hydrocarbons or vinylidene-substituted aromatic hydrocarbons to the obtained solutions. We have found that by so doing, it is possible to control the molecular weight distribution of a lithium adduct of an oligomeric hydrocarbon in the obtained reaction product within a very narrow range, and the aliphatic ether in the reaction product can be removed with utmost ease and completeness. It has also been found that the reaction product substantially free from the aliphatic ether is easily soluble in a non-polar solvent such as aromatic hydrocarbons and aliphatic hydrocarbons to form a homogeneous solution of a polymerisation initiator; that when the polymerisation of conjugated dienes is conducted with the use of this solution of the polymerisation initiator, the molecular weight distribution of the intended polymers can be controlled within a narrow range and the content of cis-1,4 structural unit of the polymer can be maintained at a high level; and that vulcanized rubber products obtained from the so produced polymers of conjugated dienes are excellent in mechanical properties such as tensile strength, rubber elasticity, rigidity, tear strength, abrasion resistance and flexural strength.

The invention provides a process for the manufacture of polymers of conjugated dienes which comprises polymerising anion-polymerisable hydrocarbons of the conjugated diene series in a non-polar solvent in the presence of a catalytic amount of an adduct of lithium with hydrocarbon, said adduct being prepared by reacting metallic lithium with a polycyclic aromatic hydrocarbon having 10–20 carbon atoms in an aliphatic ether, removing from the product an insoluble matter, adding to the obtained solution 1–10 moles, per mole of the lithium in the solution, of an ethylenically unsaturated hydrocarbon selected from the group consisting of conjugated diene hydrocarbons, vinyl-substituted aromatic hydrocarbons and vinylidene-substituted aromatic hydrocarbons, and thereafter substantially removing the aliphatic ether from the resulting solution.

The polycyclic aromatic hydrocarbons to be used in the invention are hydrocarbons having no anion-polymerisability which have 10–30, preferably 10–20, carbon atoms and 2–5, preferably 2–3, aromatic rings. Specific examples of the polycyclic aromatic hydrocarbons are:

Hydrocarbons of the naphthalene series expressed by the formula

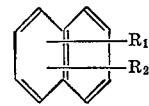

wherein R₁ and R₂ each represent a hydrogen atom or an alkyl group of 1–4 carbon atoms,
such as naphthalene, 1-methyl naphthalene, 2-methyl naphthalene, 1-ethyl naphthalene and 2-propyl naphthalene;
hydrocarbons of the phenanthrene series expressed by the formula

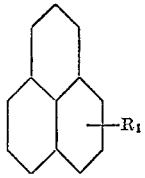

wherein R₁ is a hydrogen atom or an alkyl group having 1–4 carbon atoms,
such as phenanthrene, 2-methyl phenanthrene, and 4-ethyl phenanthrene;
hydrocarbons of the anthracene series expressed by the formula

wherein R₁ is a hydrogen atom or an alkyl group having 1–4 carbon atoms,
such as anthracene, 1-methyl anthracene, and 2-ethyl anthracene;
polyphenyls of the formula

wherein $n$ is a number of 0 to 3, such as biphenyl and terphenyl; and,
aromatic compounds of the formula

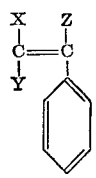

wherein each of X, Y and Z is a hydrogen atom, or a phenyl group, with the proviso that at least one of these is a phenyl group,
such as stilbene, triphenyl ethylene and tetraphenyl ethylene.

Especially preferable polycyclic aromatic hydrocarbons are naphthalene, phenanthrene and biphenyl.

To produce the polymerisation initiator of the invention, metallic lithium is reacted with the polycyclic aromatic hydrocarbon in an aliphatic ether in an inert atmosphere. The ratio of the metallic lithium (Li) to the polycyclic aromatic hydrocarbon (Ar) may be varied within a wide range, but a molar ratio of Li:Ar of 1:0.01 to 1:10 is advantageous in handling these materials. This reaction can generally be carried out at a temperature of −80° to 50° C. The reaction time differs according to the temperature, but in general, a time of 1–48 hours is sufficient. The completion of the reaction can be confirmed by the measuring of lithium content (not containing unreacted lithium) in an aliphatic ether solution of the reaction mixture.

The aliphatic ethers usable in the invention include chain or cyclic aliphatic monoethers, the examples of which are ethers represented by the formulas

wherein R₃ and R₄ each represent an alkyl group having 1–4 carbon atoms,
the sum of the carbon atoms of R₃ and R₄ being at least 3,

wherein R₅ is a straight-chain alkylene group having 4 or 5 carbon atoms.

Preferable aliphatic ethers are diethylether and tetrahydrofuran, but diisopropyl ether, di-n-butyl ether, methyl ethyl ether, ethyl-n-propyl ether and tetrahydropyran can of course be used. The ratio of the aliphatic ether to the polycyclic aromatic hydrocarbon can be varied within a wide range, but it is preferable to use 1–20 liters of the aliphatic ether per mole of the polycyclic aromatic hydrocarbon. The use of a lesser amount of aliphatic ether gives a viscous reaction product. The use of a larger amount is not preferable from the economical point of view.

Subsequently, an insoluble matter is removed from the obtained reaction mixture by such a procedure as filtration, centrifugal separation and decantation. The removal of the insoluble matter is of utmost importance in the present invention. The insoluble matter is excess or unreacted metallic lithium. Reaction of an adduct of lithium and the polycyclic aromatic hydrocarbon with a conjugated diene, vinyl- or vinylidene-substituted aromatic hydrocarbon in the presence of the metallic lithium cannot give a polymerisation initiator having a uniform molecular weight distribution. Furthermore, the initiator solution obtained by the foregoing method takes the form of slurry, when the polar solvent in the initiator solution is substituted with non-polar solution.

The solution substantially free of the insoluble residue is an aliphatic ether solution of a complex of the polycyclic aromatic hydrocarbon and lithium.

According to the present invention, an ethylenically unsaturated hydrocarbon selected from the group consisting of conjugated diene hydrocarbons, vinyl-substituted aromatic hydrocarbons and vinylidene-substituted aromatic hydrocarbons in an amount 1–10 moles, preferably 1–5 moles, per mole of the lithium in the solution, is added to the solution to thereby react the ethylenically unsaturated hydrocarbon and said complex.

The conjugated dienes used in the present invention are expressed by the formula $$\text{H}-\underset{\text{H}}{\overset{}{\text{C}}}=\underset{}{\overset{\text{R}_1}{\text{C}}}-\underset{}{\overset{\text{R}_2}{\text{C}}}=\underset{\text{H}}{\overset{}{\text{C}}}-\text{H}$$

wherein R₁ and R₂ each represent a hydrogen atom or an alkyl group having 1–4 carbon atoms, such as butadiene, isoprene, 2,3-dimethyl-1,3-butadiene, 2-ethyl-1,3-butadiene and 2,3-diethyl-1,3-butadiene.

The vinyl-substituted aromatic hydrocarbons are styrene derivatives expressed by the general formula

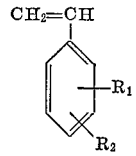

wherein each of R₁ and R₂ is a hydrogen atom and an alkyl group having 1–4 carbon atoms, such as styrene, o, m, and p-methyl styrenes.

As the vinylidene-substituted aromatic hydrocarbons, there can be mentioned α-alkyl styrene derivatives expressed by the formula

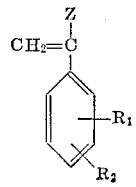

wherein $R_1$ and $R_2$ each represent a hydrogen atom and an alkyl group having 1–4 carbon atoms, and Z is an alkyl group having 1–4 carbon atoms, such as α-methyl styrene, α-methyl-o,m or p-methyl styrene.

The reaction of an adduct of lithium and the polycyclic aromatic hydrocarbon with the anion-polymerisable ethylenically unsaturated hydrocarbon is exotherimc, and it is preferable to conduct the reaction by adding the ethylenically unsaturated hydrocarbon slurry while agitating a solution of the adduct. Generally, it is preferred that this reaction should be conducted at a temperature of −80° to 50° C. for a period of 30 minutes to 2 hours. The termination of the reaction can be easily confirmed by the colouration of the reaction mixture. For instance, the naphthalene lithium complex is coloured green in its tetrahydrofuran solution, and violet in its diethyl ether solution, but it turns into orange red when oligoisoprenyl dilithium is formed, and red when oligostyryldilithium is formed.

Thus, according to the invention, a homogeneous solution of a polymerisation initiator having an active group at both ends and 2–20 polymerised units of the ethylenically unsaturated hydrocarbon used is formed.

Subsequently, the aliphatic ether in the reaction product is substantially removed. It is preferable that in order to obtain a diene polymer having a high cis-1,4 structural unit content, an amount of the remaining aliphatic ether should be less than 0.1% by weight, preferably, less than 0.05% by weight, when it is made into a solution of a non-polar solvent having an Li concentration of 1 mole/liter. The removal of the aliphatic ether in the reaction product is effected by removing the ether from the reaction product by distillation, adding a non-polar solvent, and repeating the distillation to remove the ether. Usable as the non-polar solvent are aromatic hydrocarbons or chain or cyclic aliphatic hydrocarbons such as benzene, toluene, xylene, pentane, hexane, heptane, cyclopentane, cyclohexane and petroleum ether. The ether is replaced by these non-polar solvents. The replacement can be effected preferably by distillation under vacuum, but the removal of a polar solvent by refluxing the non-polar solvent may also be effected.

Thus, the present invention has made it possible to obtain a polymerisation initiator of which molecular weight distribution is controlled within a narrow range, and which is uniformly dissolved in a non-polar solvent.

The polymerisation of conjugated dienes can be conducted under conditions known per se except that a polymerisation initiator obtained by the above-mentioned method is used as a homogeneous solution in a non-polar solvent. The monomers are polymerised in the non-polar solvent in the presence of an inert gas or in vacuum at a temperature of −80° to 80° C. for a period of 1 to 30 hours. In order to increase the cis-1,4 structural unit content of the resulting polymer, it is necessary to adjust an amount of the residual polar solvent during polymerisation to less than 0.006 mole per mole of the conjugated diene monomer. An amount of the non-polar solvent is not particularly restricted, but is determined suitably as the ratio of monomer to solvent affects the rate of polymerisation. An amount of the polymerisation initiator is neither particularly restricted, but is determined depending on the required molecular weight of the polymer.

In the present invention butadiene and isoprene can be used as the conjugated diene monomer, isoprene being particularly preferred. It is also possible to manufacture a block copolymer by using the conjugated diene monomer and less than 50%, preferably less than 40%, by weight of a monoethylenically unsaturated comonomer copolymerisable therewith. Examples of such comonomer are styrene, α-methylstyrene, vinyl toluene, vinyl xylene, ethylvinyl benzene, methyl acrylate, ethyl acrylate, methyl methacrylate, ethyl methacrylate, acrylonitrile and methacrylonitrile.

When homopolymers of conjugated dienes are produced according to the present invention, it is preferable to produce polymers having a molecular weight in the range of 10,000 to 1,000,000, particularly 100,000 to 1,000,000, and in the case of preparing block copolymers, the final copolymers should preferably have a molecular weight in the range of 100,000 to 1,000,000. From this point of view, it is generally preferable that the polymerisation initiator should be used in a ratio such that lithium is $\frac{1}{100}$ to $\frac{1}{10,000}$ mole, particularly 0.1 to 1 mmole per mole of the used monomer.

The termination of the polymerisation reaction can be made by introducing methanol, water, air or carbon dioxide gas into the polymerisation system.

The block copolymer can be manufactured in the following way.

Where non-polar monoethylenically unsaturated monomers; i.e. anion-polymerisable monoethylenically unsaturated hydrocarbon such as styrene and α-methyl styrene are used, a conjugated diene and the monoethylenically unsaturated monomer are alternately introduced into the polymerisation system. The order of addition is not critical, and the addition may be made any number of times.

Where polar monoethylenically unsaturated monomers such as methyl methacrylate and acrylonitrile are used as the comonomers, a living polymer chain of a conjugated diene homopolymer, or a living polymer chain consisting of a block of a conjugated diene and a block of a non-polar monoethylenically unsaturated monomer such as styrene and α-methyl styrene is formed first, and then the polar monoethylenically unsaturated monomer is introduced thereinto.

The conditions for the block copolymerisation are almost the same as those employed in the manufacture of homopolymers. But in the copolymerisation of the monoethylenically unsaturated monomer, the use of a polar solvent is particularly preferable because it makes the polymerisation rate higher. But a non-polar solvent or a mixture of a polar solvent and a non-polar solvent may be used. An amount of the solvent used should preferably be more than 25 times that of the monomer used for the production of homopolymer.

Homopolymers of conjugated dienes or block copolymers of conjugated dienes and monoethylenically unsaturated monomers obtained by this invention are rich in cis-1,4 structural unit content than those obtained by the conventional methods. In a polymer of isoprene, the cis-1,4 structural unit content accounts for more than 90% of the entire isoprene unit. Furthermore, the polymers obtained by the process of the invention are far more excellent in tensile strength, modulus, elongation and other mechanical properties than those obtained by the conventional methods when made into final vulcanized rubber products.

The block copolymers obtained in the invention have an excellent rubber elasticity at low temperatures, and block copolymers containing relatively much thermoplastic polymer segments are impact resistant, and can be easily molded. A further advantage of the block copolymers of the invention is that they have a uniform composition and are not contaminated by a homopolymer of the copolymerisable component.

The polymers obtained by the invention may be incorporated with a rubber anti-oxidant such as amine series and phenol series compounds, a filling reinforcing agent such as white carbon and carbon black, a filler such as calcium carbonate, talc and calcined clay, a vulcanising agent such as sulphur, a vulcanisation promoter such as organic sulphides, a vulcanisation promoting adjuvant such as zinc white, a lubricant such as metal soap and fatty acid, an extender oil such as naphthenic or aromatic oil, a peptiser or a pigment in accordance with known recipes.

The polymers of the invention either alone or in blends with natural rubber or other synthetic rubber find wide applications as, for instance, tires, footwear, belts, rolls, anti-vibratile rubbers, packings, bottle stoppers, and nipples for nursing-bottles.

Now, the invention will be further illustrated by the following examples.

The microstructure of polyisoprene was determined in accordance with the infrared method described in J. L. Binder and H. C. Ransaw, Anal. Chem. 29, 1957, pp. 503–508. The microstructure of polybutadiene was determined in accordance with J. L. Binder, Anal. Chem. 26, 1954, p. 1877. Q value is a ratio of a weight average molecular weight ($M_w$) to a number average molecular weight ($M_n$) determined by gel-permeation chromatography (GPC). The smaller this value is, the narrower the molecular distribution is:

EXAMPLE 1

Preparation of an initiator solution

In a sufficiently dried egg plant-shaped flask equipped with a magnetic stirrer and a grounded cock, 0.01 mol of naphthalene and 0.5 mol of metallic lithium were charged under the atmosphere of purified high-purity $N_2$, and immediately the pressure inside the system was made vacuum of $10^{-4}$ mm. Hg. Thereafter 100 ml. of diethyl ether, purified and degasified in advance, were charged in vacuo and stirred at 25° C. for 40 hours. After the unreacted excess metallic lithium was filtered off, 0.03 mole of purified styrene monomer was charged in vacuo and stirred at —20° C. for 2 hours and 25° C. for 3 hours. Thereafter diethyl ether was removed by vacuum distillation and 300 ml. of benzene were added in three increments to substitute the residual diethyl ether, to which 100 ml. of benzene were added to obtain an initiator solution.

The alkali concentration of said initiator solution was 0.078 mole/liter and an amount of ether therein was less than 0.01% by weight (which value was a value which could not be measured by gas chromatography).

EXAMPLE 2

As a reactor a three-necked 1000 ml. pressure-resistant glass container equipped with a magnetic stirring rod, an inlet for an initiator solution and an inlet for benzene solution of monomer was used. After the interior of the system was sufficiently dried, 20 ml. of the initiator solution obtained in Example 1 and 400 ml. of benzene were charged in the reactor under the atmosphere of $N_2$, and while the mixture was stirred 200 ml. of isoprene were added. Thereafter the reaction was continued at 30° C. for 6 hours. Thereafter the reaction product was charged in 1 ml. of methanol containing 0.3 g. of antioxidant, β-phenylnaphthylamine to produce a polymer precipitate. The precipitate was separated and thereafter dried at 50° C. under a reduced pressure for 48 hours. The results were as follows.

| | |
|---|---|
| Conversion _____percent__ | 93 |
| Cis-1,4 structure _____do____ | 94 |
| 3,4 structure _____do____ | 6 |
| 1,2 structure _____ | Trace |
| Molecular weight (average) _____ | 210,000 |
| Q value [1] _____ | 1.66 |

[1] Q value denotes $M_w/M_n$ by GPC.

Using the polymer obtained by the above reaction, a test piece was prepared by standard rubber compound method and the following values of mechanical characteristics were obtained.

Recipe

| | Parts by weight |
|---|---|
| Polyisoprene _____ | 100 |
| Zinc stearate _____ | 3 |
| Sulfur _____ | 2 |
| TMT (vulcanizing accelerator) _____ | 1 |
| BHT (antioxdant) _____ | 1 |
| Stearic acid _____ | 1 |

TMT: (tetramethyl thiuram disulfide)
BHT: (2,6-ditertiary butylphenol)

Vulcanizing conditions: 150° C.; 8 min.; 150 kg./cm.² g.

Values of mechanical properties:

| | |
|---|---|
| 300% modulus (kg./cm.²) _____ | 11.5 |
| Tensile strength (kg./cm.²) _____ | 112 |
| Elongation (percent) _____ | 980 |
| Hardness (Shore A) _____ | 28 |

EXAMPLE 3

Preparation of an initiator solution

An initiator solution was prepared as in Example 1. The amounts of addition of each reagent were as follows.

| | | |
|---|---|---|
| (1) | Phenanthrene _____ | 0.004 mole. |
| | Lithium _____ | 0.1 mole. |
| | Diethylether _____ | 90 ml. |
| (2) | Styrene _____ | 0.010 mole. |
| (3) | n-Hexane _____ | 300 ml. was substituted in 3 times. | thereafter 100 ml. of n-hexane was added to obtain an initiator solution.

The residual amount of ether in the obtained initiator solution was less than 0.01% by weight and the alkali concentration of the solution was 0.036 mole/liter.

EXAMPLE 4

Using the same reactor as in Example 2, under the atmosphere of argon 10 ml. of the initiator solution obtained in Example 3 and 92 ml. of benzene were charged in the reactor and while the mixture was stirred, 14 ml. of isoprene were added. Thereafter the mixture was heated at 60° C. for 30 minutes and at 30° C. for 18 hours. Of 116 ml. of the polymer solution, 23 ml. were taken and treated with methanol.

| | |
|---|---|
| Conversion _____percent__ | 98 |
| Cis-1,4 structure _____do____ | 93.5 |
| 3,4 structure _____do____ | 4.5 |
| 1,2 structure _____do____ | 2.0 |
| Molecular weight (average) _____ | 69,000 |
| Q value _____ | 1.85 |

EXAMPLE 5

Preparation of an initiator solution

In a sufficiently dried egg plant-shaped flask equipped with a magnetic stirrer and a ground cock, 0.1 mol of naphthalene and 0.5 mol of metallic lithium were charged under the atmosphere of argon. Thereafter, the pressure inside the system was made vacuum of $10^{-4}$ mm. Hg and 100 ml. of tetrahydrofuran, purified and degasified in advance, were charged in vacuo. At 25° C. stirring was continued for 6 hours. The unreacted excess metallic lithium was filtered off. Thereafter 0.4 mole of isoprene monomer was added in vacuo, and the mixture was stirred at —20° C. for 2 hours and at 25° C. for 3 hours. Tetrahydrofuran was removed by vacuum distillation, the pressure inside the flask was again made $10^{-4}$ mm. Hg, thereafter 100 ml. of n-heptane was added and the mixture was stirred. Next the added n-heptane was removed by vacuum distillation, 100 ml. of n-heptane was added anew, and the mixture was stirred for 1 hour. Thereafter the n-heptane was completely removed and 100 ml. of n-heptane was added anew and the mixture was stirred for 1 hour. A proper amount of the mixture was taken and used as a polymerization initiator.

Concentration of the obtained initiator solution was 0.85 mol/liter as measured by titration of hydrochloric acid. The amount of tetrahydrofuran in the initiator solution was less than 0.01% by weight (a value which could not be measured by gas chromatography).

EXAMPLE 6

A 150-ml. reactor equipped with an ampoule containing 50 ml. of isoprene and 50 ml. of n-heptane, and an ampoule containing 2 ml. of the initiator solution of Example 5 was prepared; air inside the system was sufficiently dried and made vacuum; thereafter 30 ml. of n-heptane purified and degasified in advance were charged in the reactor. First by a breaker 2 ml. of the initiator solution were charged into the reactor; next at room temperature, by a breaker, a seal was broken and the n-heptane solution of the isoprene monomer was mixed with the initiator solution. The mixture was stirred, heated to 60° C. and left to stand for 2 hours. After 2 hours, the reaction product was charged in 1 ml. of methanol added with 0.3 g. of antioxidant, β-phenylnaphthylamine, to produce a polymer precipitate and the precipitate was filtered off and dried at 50° C. under a reduced pressure for 48 hours. The conversion was 99%.

Micro structure of the polymer:

| | |
|---|---|
| Cis-1,4 structure _____percent__ | 91 |
| 3,4 structure _____do____ | 8 |
| 1,2 structure _____do____ | 1 |
| Molecular weight (average) _____ | 60,000 |
| Q value _____ | 1.50 |

EXAMPLE 7

A reactor equipped with an ampoule containing 68 ml. of isoprene and 100 ml. of toluene, and an ampoule containing 2 ml. of the initiator solution of Example 5, was prepared and air inside the system was sufficiently dried. Into the reactor, 50 ml. of toluene purified and degasified in advance was charged in vacuo. At first by a breaker the initiator solution was introduced into the reactor, and at 25° C. by a breaker a seal was broken and a toluene solution of the isoprene monomer was added to the initiator solution and the mixture was stirred. The mixture was left to stand at 30° C. for 6 hours, thereafter the reaction product was charged in 1 liter of methanol added with 0.2 g. of antioxidant, β-phenylnaphthylamine to produce a polymer precipitate; the precipitate was filtered off and dried at 50° C. under a reduced pressure for 48 hours. The conversion was 96.8%.

Microstructure of the polymer:

| | |
|---|---|
| Cis-1,4 structure _____percent__ | 92 |
| 3,4-structure _____do____ | 7 |
| 1,2-structure _____do____ | 1 |
| Molecular weight (average) _____ | 61,000 |
| Q value _____ | 1.68 |

EXAMPLE 8

The following components were polymerized under the same conditions as those in Example 1.

| | |
|---|---|
| Petroleum ether _____ml__ | 200 |
| Isoprene _____ml__ | 100 |
| Initiator solution (of Example 5) _____ml__ | 5 |
| Conversion _____percent__ | 96.8 |
| Cis-1,4 structure _____do____ | 92 |
| 3,4-structure _____do____ | 6 |
| 1,2-structure _____do____ | 2 |
| Molecular weight (average) _____ | 48,000 |
| Q value _____ | 1.46 |

EXAMPLE 9

To 24 ml. of the 116 ml. of the polymer solution obtained in Example 4, 0.025 mol of methylmethacrylate (MMA) dissolved in 20 ml. of tetrahydrofuran was added. When the mixture was left to stand at 25° C. for 18 hours, 65% of added MMA was copolymerized. The micro structure of isoprene unit was the same as that of Example 4.

The polymer was a block copolymer of MMA-cis 1,4 polyisoprene-MMA.

From the block copolymer, a film was produced by casting.

The film was transparent, exhibiting rubber elasticity.

EXAMPLE 10

To 23 ml. of the 116 ml. of the polymer solution obtained in Example 4, 0.12 mole of acrylonitrile dissolved in 20 ml. of tetrahydrofuran was added. The reaction was conducted at 10° C. for 20 hours; thereafter the produced polymer was treated by the process of Example 2.

Of the acrylonitrile added, 10% was block copolymerized. A film obtained from the block copolymer exhibited rubber elasticity.

EXAMPLE 11

By the same process as in Example 2, polymerization was carried out in the atmosphere of high-purity argon.

| | |
|---|---|
| Initiator solution (of Example 3) _____ml__ | 2 |
| Isoprene _____mole__ | 0.2 |
| n-Hexane _____ml__ | 50 |

The polymerization was carried out at 60° C. for 30 minutes and at 30° C. for 20 hours. The polymer was treated by the process of Example 2.

| | |
|---|---|
| Conversion _____percent__ | 99.6 |
| Cis-1,4 structure _____do____ | 93 |
| 3,4 structure _____do____ | 6 |
| 1,2 structure _____do____ | 1 |
| Molecular weight (average) _____ | $3.9 \times 10^5$ |
| Q value _____ | 1.98 |

Using the polymer, by the standard rubber compound method in Example 2, a test piece was prepared and the following values of mechanical properties were obtained.

| | |
|---|---|
| 300% modulus (kg./cm.$^2$) _____ | 12.5 |
| Tensile strength (kg./cm.$^2$) _____ | 123 |
| Elongation (percent) _____ | 1000 |
| Hardness (Shore A) _____ | 27 |

EXAMPLE 12

Polymerization was carried out in vacuo by the same process as in Example 6.

| | |
|---|---|
| Initiator solution (of Example 3) _____ml__ | 5 |
| Isoprene _____mole__ | 0.18 |
| Benzene _____ml__ | 133 |

The polymerization was carried out at 60° C. for 30 minutes and at 30° C. for 20 hours.

Of the produced polymer solution, 40 ml. was taken separately and treated with methanol.

| | |
|---|---|
| Conversion _____percent__ | 98.6 |
| Cis-1,4 structure _____do____ | 93 |
| 3,4 structure _____do____ | 6 |
| 1,2 structure _____do____ | 1 |
| Molecular weight (average) _____ | $1.37 \times 10^5$ |
| Q value _____ | 1.75 |

EXAMPLE 13

To 40 ml. of the 150 ml. of the polymer solution obtained in Example 12, 0.025 mole of styrene dissolved in 20 ml. of tetrahydrofuran was added at 30° C.; the mixture was reacted at this temperature for 20 hours, thereafter it was treated by methanol.

78% of added styrene was reacted and a block copolymer of styrene-cis-1,4 polyisoprene-styrene was obtained.

The Q value of the block copolymer was 1.70.

From this block copolymer a test piece was prepared by casting and tests of mechanical properties were conducted. The results were as follows.

| | |
|---|---|
| 300% modulus (kg./cm.$^2$) _____ | 13.0 |
| Tensile strength (kg./cm.$^2$) _____ | 105 |
| Elongation (percent) _____ | 1300 |
| Hardness (Shore A) _____ | 82 |

EXAMPLE 14

Preparation of an initiator solution

An initiator solution was prepared by the same process as in Example 1.

The amount of each reagent was as follows.

(1) {
  Biphenyl ........................ mole__ 0.01
  Lithium ......................... do____ 0.04
  Diethylether .................... ml__ 100
}

A biphenyl-lithium complex compound was synthesized; after separating excess lithium, isoprene was added.

(2) Isoprene ........................ mole__ 0.02
(3) Cyclohexane .................... ml__ 400

With 400 ml. of cyclohexane substitution was effected 4 times to remove residual diethylether, and 200 ml. of cyclohexane was added to produce an initiator solution. The alkali concentration of the initiator solution was 0.022 mole/liter.

EXAMPLE 15

A 10-liter pressure-resistant stainless container (reactor) equipped with a stirring rod, an inlet for an initiator solution, an inlet for cyclohexane solution of isoprene monomer and an entrance for inserting a thermometer was prepared. After interior of the system was sufficiently dried, under the atmosphere of pure $N_2$, 100 ml. of the initiator solution and 60 ml. of cyclohexane were charged into the reactor and stirred. After the temperature was made 5° C., 500 ml. of isoprene were added. After the addition, the temperature was kept at 5° C. and stirring was continued for 24 hours. Treatment of the polymer was the same as that of Example 2.

Conversion ........................ percent__ 97
Cis-1,4 structure ................. do____ 94
3,4-structure ..................... do____ 6
1,2 structure ..................... Trace
Molecular weight (average) ........ 360,000
Q value ........................... 1.75

From the polymer by the process of Example 2, a test piece for testing mechanical properties was prepared. Values of mechanical properties of a vulcanized rubber were as follows.

Tensile strength (kg./cm.$^2$) .... 126
Elongation (percent) .............. 930
300% modulus (kg./cm.$^2$) ........ 12.1
Hardness (Shore A) ................ 27

EXAMPLE 16

By the same process as that of Example 15, using 100 ml. of the initiator solution of Example 15, 410 ml. of butadiene were added at −15° C. in 600 ml. of benzene and polymerization was carried out in high-purity $N_2$. Butadiene was collected in a measuring vessel at −15° C. and added into the reactor.

Conversion ........................ percent__ 96
1,2-structure ..................... do____ 16
Trans-1,4 structure ............... do____ 51
Cis-1,4 structure ................. do____ 38
Molecular weight (average) ........ 280,000
Q value ........................... 2.05

EXAMPLE 17

Of the produced polymer solution of Example 16, 650 ml. were taken, to which 0.25 mole of styrene dissolved in a mixed solvent of 120 ml. of tetrahydrofuran and 200 ml. of benzene was added. When the reaction was carried out for 24 hours at 20° C., 82% of the added styrene was copolymerized. The micro structure of butadiene unit was the same as that of Example 16. The polymer was a styrene-butadiene-styrene block copolymer. From the block copolymer, a test piece was obtained by the method same as that in Example 9. Values of the mechanical properties were as follows.

Tensile strength (kg./cm.$^2$) .... 110
Elongation (percent) .............. 1400
300% modulus (kg./cm.$^2$) ........ 13.0
Hardness (Shore A) ................ 55

EXAMPLE 18

Of the produced polymer solution of Example 16, 650 ml. were taken, to which 0.25 mole of MMA dissolved in a mixed solvent of 120 ml. of tetrahydrofuran and 200 ml. of benzene was added. When the reaction was carried out at −78° C. for 24 hours, 75% of the added MMA was copolymerized. The micro structure of butadiene unit was the same as that in Example 16. The polymer was a MMA-butadiene-MMA block copolymer. From the block copolymer, a test piece was prepared by a process same as that in Example 9. Values of mechanical properties were as follows.

Tensile strength (kg./cm.$^2$) .... 125
Elongation (percent) .............. 860
300% modulus (kg./cm.$^2$) ........ 13
Hardness (Shore A) ................ 50

EXAMPLE 19

Preparation of an initiator solution

By the same process as that in Example 1, an initiator solution was prepared.

The amount of each agent was as follows.

(1) {
  Stilbene ........................ mole__ 0.005
  Lithium ......................... do___ 0.02
  Diethylether .................... ml__ 100
}
(2) α-Methylstyrene ................ mole__ 0.01
(3) Cycloheptane ................... ml__ 500

After substitution was effected 4 times with 500 ml. of cycloheptane, residual diethylether was removed completely and 100 ml. of cycloheptane was added to obtain an initiator solution, the alkali concentration of which was 0.009 mole/liter.

EXAMPLE 20

By the same process as that in Example 15, polymerization was carried out in high-purity $N_2$.

Cycloheptane ...................... ml__ 5000
Isoprene .......................... ml__ 500
Initiator solution (of Example 19) ml__ 100
Conversion ........................ percent__ 96
Cis-1,4 structure ................. do____ 93
3,4-structure ..................... do____ 7
1,2-structure ..................... Trace
Molecular weight (average) ........ 700,000
Q value ........................... 2.48

From the polymer, a test piece for testing mechanical properties was prepared by the method of Example 2. Values of mechanical properties of a vulcanized rubber were as follows.

Tensile strength (kg./cm.$^2$) .... 118
Elongation (percent) .............. 950
300% modulus (kg./cm.$^2$) ........ 10.5
Hardness (Shore A) ................ 26

EXAMPLE 21

Preparation of an initiator solution

By the same process as that in Example 1, an initiator solution was prepared.

The amount of each reagent was as follows.

(1) {
  Methylnaphthalene ............... mole__ 0.03
  Lithium ......................... do___ 0.05
  Dibutylether .................... ml__ 100
}
(2) α-Methylstyrene ................ mole__ 0.04
(3) Benzene ........................ ml__ 500

Substitution was effected 6 times with 500 ml. of benzene to remove residual diethylether completely, and 100 ml. of benzene was added anew to obtain an initiator solution, the alkali concentration of which was 0.056 mole/liter.

EXAMPLE 22

By the same process as that in Example 15, polymerization was carried out in high-purity $N_2$.

| | |
|---|---|
| Benzene _____ml__ | 5000 |
| Isoprene _____ml__ | 500 |
| Initiator solution (of Example 21)_____ml__ | 35 |
| Conversion _____percent__ | 97 |
| Cis-1,4 structure _____do____ | 92 |
| 3,4-structure _____do____ | 7 |
| 1,2-structure _____do____ | 1 |
| Molecular weight (average) _____ | 400,000 |
| Q value _____ | 2.26 |

Values of mechanical properties of a vulcanized rubber of the obtained polymer were as follows.

| | |
|---|---|
| Tensile strength (kg./cm.$^2$)_____ | 97.5 |
| Elongation (percent) _____ | 1150 |
| 300% modulus (kg./cm.$^2$) _____ | 9.0 |
| Hardness (Shore A) _____ | 26 |

EXAMPLE 23

Preparation of an initiator solution

By the same process as that in Example 1, an initiator solution was prepared.

The amount of each reagent was as follows.

| | | |
|---|---|---|
| (1) | Anthracene _____mole__ | 0.01 |
| | Lithium _____do___ | 0.1 |
| | Diethylether _____ml__ | 100 |
| (2) | 1-phenylbutadiene _____mole__ | 0.02 |
| (3) | Toluene _____ml__ | 400 |

Substitution was effected 4 times with 400 ml. of toluene to remove residual diethylether completely, and 200 ml. of toluene was added anew to obtain an initiator solution, the alkali concentration of which was 0.028 mole/liter.

EXAMPLE 24

By the same process as that in Example 16, polymerization was carried out in high-purity $N_2$.

| | |
|---|---|
| Toluene _____ml__ | 5000 |
| Butadiene (−15° C.)_____ml__ | 410 |
| Initiator solution (of Example 23) _____ml__ | 50 |
| Conversion _____percent__ | 94 |
| 1,2 structure _____do____ | 9 |
| Trans-1,4 structure _____do____ | 49 |
| Cis-1,4 structure _____do____ | 42 |
| Molecular weight (average) _____ | 410,000 |
| Q value _____ | 2.67 |

Comparative Example 1 (a process corresponding to that of U.S. Pat. 3,157,604)

A polymerization initiator was prepared by mixing and reacting the following amounts of materials.

| | |
|---|---|
| Naphthalene _____mole__ | 0.01 |
| Lithium _____do___ | 0.5 |
| Isoprene _____do___ | 0.03 |
| Diethylether _____ml__ | 100 |

The reaction conditions were as follows.

| | |
|---|---|
| Reaction temperature _____° C__ | 25 |
| Reaction time _____hours__ | 48 |

The reaction was carried out in vacuo, 2 hours after starting of the reaction, 0.015 mole of isoprene was added and 2 hours thereafter 0.015 mole of isoprene was added again and the reaction was carried out for 44 hours. Diethylether was removed in vacuo by distillation. The residual solid was dissolved in 100 ml. of n-heptane and a solution having an alkali concentration of 0.25 mole/liter was prepared. The initiator solution was a non-uniform slurry, which was used as the polymerization initiator for isoprene as follows.

| | |
|---|---|
| Isoprene _____mole__ | 1.06 |
| n-Heptane _____do____ | 800 |
| Initiator _____do____ | $1.13 \times 10^{-3}$ |
| Reaction temperature _____° C.__ | 50 |
| Reaction time _____hours__ | 24 |
| Conversion _____percent__ | 96.5 |

For information, the reaction system at the time of polymerization was non-uniform.

| | |
|---|---|
| Cis-1,4 structure _____percent__ | 91.0 |
| Molecular weight (average) _____ | $2.77 \times 10^5$ |
| Q value _____ | 2.66 |

Values of mechanical properties of a vulcanized rubber of the obtained polymer were as follows.

The compounding was carried out as in Example 2.

| | |
|---|---|
| 300% modulus (kg./cm.$^2$) _____ | 10.0 |
| Tensile strength (kg./cm.$^2$) _____ | 23.0 |
| Elongation (percent) _____ | 650 |
| Hardness (Shore A) _____ | 26 |

Comparative Example 2

To 0.01 mol of the slurry-formed solution obtained by the process of Comparative Example 1, 0.05 mol of isoprene was added, but the latter did not dissolve in the former and the resultant mixture was non-uniform, which was used as polymerization initiator for isoprene.

The reaction was carried out in vacuo.

| | |
|---|---|
| Isoprene _____mole__ | 0.25 |
| n-Heptane _____ml__ | 100 |
| Initiator _____mole__ | $0.304 \times 10^{-3}$ |
| Polymerization temperature _____°C__ | 30 |
| Polymerization time _____hours__ | 48 |
| Conversion _____percent__ | 98.5 |

The reaction system at the time of polymerization was non-uniform.

| | |
|---|---|
| Cis-1,4 structure _____percent__ | 89.0 |
| Molecular weight (average) _____ | $2.3 \times 10^{-5}$ |
| Q value _____ | 2.30 |

Mechanical properties of a vulcanized rubber of the obtained polymer were as follows.

| | |
|---|---|
| 300% modulus (kg./cm.$^2$) _____ | 7.8 |
| Tensile strength (kg./cm.$^2$) _____ | 18.0 |
| Elongation (percent) _____ | 700 |
| Hardness (Shore A) _____ | 27 |

Comparative Example 3 (a process corresponding to that of U.S. Pat. 3,170,903)

| | |
|---|---|
| Naphthalene _____mole__ | 0.01 |
| Lithium _____do____ | 0.05 |
| Diethylether _____ml__ | 100 |

The above components were charged in a flask equipped with a magnetic stirring device, and the mixture was stirred at 20° C. for 48 hours. Diethylether was removed at 30° C. by distillation in vacuo. Thereafter, n-heptane was added to dissolve a solid component, the mixture was stirred for 1 hour; thereafter n-heptane was removed by distillation to thereby completely remove ether. Finally, n-heptane was added to the mixture to prepare a 0.035 mole/liter solution of n-heptane, which was used as polymerization initiator for the next polymerization.

The reaction was carried out in vacuo under the following conditions.

| | | |
|---|---|---|
| Isoprene | mole | 0.20 |
| n-Heptane | ml | 100 |
| Initiator | mole | $0.22 \times 10^{-3}$ |
| Polymerization temperature | °C | 30 |
| Polymerization time | hours | 48 |
| Conversion | percent | 89.0 |
| Cis-1,4 structure | do | 89.0 |
| Molecular weight (average) | | $3.8 \times 10^5$ |
| Q value | | 3.28 |

The reaction system of polymerization was non-uniform.

Values of mechanical properties of a vulcanized rubber of the obtained polymer were as follows.

| | |
|---|---|
| 300% modulus (kg./cm.$^2$) | 7.4 |
| Elongation (percent) | 620 |
| Tensile strength (kg./cm.$^2$) | 16 |
| Hardness (Shore A) | 27 |

Comparative Example 4

An example of a block copolymer using the polymerization initiator of Comparative Example 2 will be shown.

The reaction was carried out in vacuo under the following conditions.

| | | |
|---|---|---|
| Isoprene | mole | 0.25 |
| Benzene | ml | 100 |
| Initiator (prepared in Comparative Example 2) | mole | $0.30 \times 10^{-3}$ |
| Polymerization temperature | °C | 30 |
| Polymerization time | hours | 48 |

After completion of polymerization of isoprene (a part of the system was taken and 100% of conversion was confirmed), 50 ml. of tetrahydrofuran was added and the mixture was well stirred. At that time insoluble matters were dissolved and the system became uniform.

Next 0.052 mole of styrene dissolved in 20 ml. of tetrahydrofuran (THF) was added. The copolymerization was carried out under the following conditions.

| | | |
|---|---|---|
| Polymerization temperature | °C | 10 |
| Polymerization time | hours | 24 |

The polymerization system showed a uniform solution and conversion was 98.3% and the Q value was 3.06.

The polymer was dissolved in toluene and a film was made by casting. The film was opaque, failing to have any rubber elasticity.

Comparative Example 5 (case of not completely removing a polar solvent)—Preparation of an initiator solution

| | | |
|---|---|---|
| Naphthalene | mole | 0.10 |
| Metallic lithium | do | 0.12 |
| Diethylether | ml | 100 |

The aforementioned components were charged in a flask having a stirrer under the atmosphere of nitrogen, and the mixture was stirred at room temperature of 23° C. for 4 hours. Interior of the system was kept at atmosphere of purified nitrogen. Next, 0.20 mole of isoprene was added, and the mixture was stirred for 1 hour, next 130 ml. of n-heptane purified in advance was added and the reaction solution was stirred with heating and diethylether was removed by distillation. As soon as diethylether stopped being distilled off, heating and distillation was stopped, and the mixture was placed under nitrogen pressure and retained. The alkali concentration of the initiator solution was 0.74 mole/liter. The amount of diethylether in the initiator solution was 1.5% by weight.

Using the initiator solution obtained by the foregoing reaction, polymerization of isoprene was carried out. The polymerization reaction used the following device. Namely, it was a flask equipped with a magnetic stirrer, heated and dehydrated in advance and air inside the flask was substituted by nitrogen in advance.

The flask was charged with 100 ml. of purified petroleum ether and 20 ml. of isoprene, while stirring the mixture 10 ml. of an initiator solution was added thereto. The reaction temperature was 25° C. and the reaction time was 4 hours.

The polymer was treated with methanol. The amount of diethylether existing in the reaction system was 0.007 mole per mole of isoprene and the conversion was 91%.

Micro structure of the obtained polymer were as follows.

| | | |
|---|---|---|
| 3,4-structure | percent | 26 |
| 1,2-structure | do | 4 |
| Cis-1,4 structure | do | 70 |
| Molecular weight (average) | | 39,000 |
| Q value | | 1.86 |

Comparative Example 6 (case of not removing metallic lithium)

Upon preparing an initiator solution by a process same as that in Example 1, an initiator solution was prepared without filtering off unreacted excess metallic lithium. The amount of each reagent was as follows.

| | | | |
|---|---|---|---|
| (1) | Naphthalene | mole | 0.01 |
| | Lithium | do | 0.5 |
| | Diethylether | ml | 100 |

In a diethylether solution of a naphthalene-lithium complex compound, metallic lithium was contained because lithium was not filtered off. To the solution 0.03 mol of purified styrene monomer was added in vacuo; the reaction was carried out as in Example 1; thereafter 300 ml. of benzene was added and diethylether was substituted in three divided times, to which 100 ml. of benzene was added anew to produce an initiator solution.

The amount of ether in the initiator solution was less than 0.01% by weight and alkali concentration was 0.185 mole/liter.

Using the above initiator, polymerization of isoprene was carried out in high-purity N$_2$ by the same process as that in Example 2.

| | Ml. |
|---|---|
| Initiator solution | 8 |
| Isoprene | 200 |
| Benzene | 400 |

The results were as follows.

| | | |
|---|---|---|
| Conversion | percent | 94 |
| Cis-1,4 structure | do | 89 |
| 3,4-structure | do | 10 |
| 1,2-structure | do | 1 |
| Molecular weight (average) | | 260,000 |
| Q value | | 3.67 |

Mechanical properties of a vulcanized rubber prepared by using the obtained polymer obtained in the aforementioned process were as follows.

| | |
|---|---|
| Tensile strength (kg./cm.$^2$) | 19 |
| Elongation (percent) | 730 |
| 300% modulus (kg./cm.$^2$) | 8.3 |
| Hardness (Shore A) | 25 |

We claim:

1. In a process for the production of polymers of conjugated dienes which comprises polymerizing anion-polymerizable hydrocarbons of the conjugated diene series in a non-polar solvent in the presence of a catalyst, the improvement wherein said catalyst comprises an adduct of lithium and hydrocarbon, said adduct being prepared by (1) reacting metallic lithium with a polycyclic aromatic hydrocarbon having 10–30 carbon atoms in an ether selected from an aliphatic ether, tetrahydrofuran and tetrahydropyran; (2) removing from the reaction system of step (1) unreacted metallic lithium; (3) adding to the solution of step (2) 1–10 moles, per mole of lithium in the solution, of an ethylenically unsaturated hydrocarbon selected from the group consisting of conjugated diene hydrocarbons, vinyl-substitued aromatic hydrocarbons and vinylidene-substituted aromatic hydrocarbons; and (4) thereafter removing said ether from the resulting solution so that said ether constitutes less than 0.1% by weight of the solution by substituting said ether by a non-polar solvent thereby producing an oligomeric dilithium adduct of a homogeneous molecular weight.

2. The process of claim 1, wherein said polycyclic aromatic hydrocarbon is naphthalene, anthracene, phenanthrene or biphenyl.

3. A process according to claim 1, wherein said ether is diethylether or tetrahydrofuran.

4. A process for the production of block copolymers wherein a block polymer of isoprene and block polymer of an anion-polymerization monoethylenically unsaturated monomer selected from the group consisting of styrene, α-methylstyrene, vinyl toluene, vinyl xylene, ethylvinyl benzene, methyl acrylate, ethyl acrylate, methyl methacrylate, ethyl methacrylate, acrylonitrile and methacrylonitrile are alternately connected with each other which comprises alternately polmerizing isoprene and said anion-polymerizable monoethylenically unsaturated monomer in an amount so as to provide less than 50% of a polymer unit based on the entire polymer, in a non-polar solvent in the presence of a catalyst consisting of an adduct between lithium and a hydrocarbon, said adduct being prepared by reacting metallic lithium with a polycyclic aromatic hydrocarbon having 10–30 carbon atoms in an ether selected from an aliphatic ether, tetrahydrofuran and tetrahydropyran; removing from the reaction system unreacted lithium; adding to the obtained solution 1–10 moles, per mole of the lithium in the solution, of an ethylenically unsaturated hydrocarbon selected from the group consisting of conjugated diene hydrocarbons, vinyl-substituted aromatic hydrocarbons and vinylidene-substituted aromatic hydrocarbons; and thereafter removing said ether from the resulting solution so that said ether is present in an amount less than 0.1% by weight based on the weight of the solution.

5. The process of claim 4, wherein the anion-polymerizable monoethylenically unsaturated hydrocarbon is styrene, α-methylstyrene or vinyltoluene.

6. A process for the production of block copolymers wherein a polymer of an anion-polymerizable monoethylenically unsaturated monomer selected from the group consisting of styrene, α-methylstyrene, vinyl toluene, vinyl xylene, ethylvinyl benzene, methyl acrylate, ethyl acrylate, methyl methacrylate, ethyl methacrylate, acrylonitrile and methacrylonitrile is connected to both ends of blocks of isoprene which comprises polymerizing isoprene in a non-polar solvent in the presence of a catalyst consisting of an adduct between a hydrocarbon and lithium, and then introducing said anion-polymerizable monoethylenically unsaturated hydrocarbon into the polymerization system in an amount so as to provide less than 50% by weight of a polymer unit based on the entire polymer to thereby effect the polymerization, said adduct being prepared by reacting metallic lithium with a polycyclic aromatic hydrocarbon having 10–30 carbon atoms in an ether selected from an aliphatic ether, tetrahydrofuran and tetrahydropyran; removing from the reaction system unreacted lithium; adding to the obtained solution 1–10 moles, per mole of the lithium in the solution, of an ethylenically unsaturated hydrocarbon selected from the group consisting of conjugated diene hydrocarbons, vinyl-substituted aromatic hydrocarbons and vinylidene-substituted aromatic hydrocarbons; and thereafter removing said ether from the resulting solution so that the ether is present in an amount less than 0.1% by weight based on the weight of the solution.

References Cited
UNITED STATES PATENTS

| | | | |
|---|---|---|---|
| 3,157,604 | 11/1964 | Strobel | 260—94.2 M |
| 3,377,404 | 4/1968 | Zelinski | 260—94.2 |
| 3,388,178 | 6/1968 | Kamienski et al. | 260—94.2 |

JAMES A. SEIDLECK, Primary Examiner

U.S. Cl. X.R.

260—83.7, 94.2 M, 665, 879